(12) United States Patent
Zhuang

(10) Patent No.: US 7,029,202 B2
(45) Date of Patent: Apr. 18, 2006

(54) METHOD FOR TREATING METAL-CONTAMINATED WATER AND SOIL

(76) Inventor: J. Ming Zhuang, 600 Dansey Ave., Coquitlam, B.C. (CA) V3K 3E8

( * ) Notice: Subject to any disclaimer, the term of this patent is extended or adjusted under 35 U.S.C. 154(b) by 22 days.

(21) Appl. No.: 10/199,119

(22) Filed: Jul. 22, 2002

(65) Prior Publication Data

US 2004/0010955 A1   Jan. 22, 2004

(51) Int. Cl.
    B09C 1/08 (2006.01)
(52) U.S. Cl. .................. 405/128.5; 210/710; 210/725; 210/727; 210/912; 210/913; 210/914; 405/128.75; 588/256
(58) Field of Classification Search .............. 210/710, 210/724, 725, 727, 912–914; 405/128.5, 405/128.75; 588/256
See application file for complete search history.

(56) References Cited

U.S. PATENT DOCUMENTS

| | | | | |
|---|---|---|---|---|
| 3,635,742 A | * | 1/1972 | Fujimasu ............... | 106/287.17 |
| 4,209,335 A | * | 6/1980 | Katayama et al. ........ | 588/252 |
| 4,211,645 A |   | 7/1980 | Zajic et al. ............ | 210/611 |
| 4,279,756 A | * | 7/1981 | Weiss et al. ............ | 210/667 |
| 4,812,240 A |   | 3/1989 | Watts .................. | 210/639 |
| 4,909,849 A |   | 3/1990 | Funderburk ............. | 106/697 |
| 4,933,087 A |   | 6/1990 | Markham, Jr. et al. .... | 210/626 |
| 5,238,583 A |   | 8/1993 | Fortson ................ | 405/129.27 |
| 5,252,116 A |   | 10/1993 | Markham et al. ......... | 71/13 |
| 5,296,293 A |   | 3/1994 | Jobst .................. | 428/403 |
| 5,298,168 A |   | 3/1994 | Guess |   |
| 5,302,180 A | * | 4/1994 | Hjersted ............... | 71/24 |
| 5,308,499 A |   | 5/1994 | Dixon et al. ........... | 210/705 |
| 5,308,500 A |   | 5/1994 | Schwarzbach |   |
| 5,347,077 A | * | 9/1994 | Hooykaas et al. ........ | 588/257 |
| 5,543,058 A |   | 8/1996 | Miller ................. | 210/725 |
| 5,547,585 A |   | 8/1996 | Shepherd et al. ........ | 210/673 |
| 5,631,160 A |   | 5/1997 | Bruso .................. | 435/262.5 |
| 5,649,895 A |   | 7/1997 | Fix et al. ............. | 588/256 |
| 5,651,895 A |   | 7/1997 | Gordon ................. | 210/709 |
| 5,660,734 A |   | 8/1997 | Agree et al. ........... | 210/712 |
| 5,679,257 A |   | 10/1997 | Coate et al. ........... | 210/695 |
| 5,719,099 A |   | 2/1998 | Bhat ................... | 502/414 |
| 5,720,886 A |   | 2/1998 | Iwinski ................ | 210/727 |
| 5,736,032 A |   | 4/1998 | Cox et al. ............. | 424/76.5 |
| 5,769,961 A |   | 6/1998 | Peters et al. .......... | 134/25.1 |
| 5,961,837 A |   | 10/1999 | Ferrara et al. ......... | 210/696 |
| 5,967,965 A | * | 10/1999 | Vyshkina et al. ........ | 588/256 |
| 5,968,245 A |   | 10/1999 | Jones et al. ........... | 106/277 |
| 6,143,692 A |   | 11/2000 | Sanjay et al. .......... | 502/401 |
| 6,153,108 A |   | 11/2000 | Klock et al. ........... | 210/722 |
| 6,274,045 B1 |   | 8/2001 | Kreisler ............... | 210/710 |
| 6,313,368 B1 |   | 11/2001 | Bhat ................... | 588/231 |
| 6,315,906 B1 |   | 11/2001 | Sassaman, Jr. et al. ... | 210/666 |

FOREIGN PATENT DOCUMENTS

| GB | 1119227 | 7/1968 |
|---|---|---|
| JP | 52-62186 | 5/1977 |
| JP | 53-11758 | 2/1978 |
| SU | 1649026 | 5/1991 |
| SU | 1699951 | 12/1991 |

OTHER PUBLICATIONS

RU XP002257974, Dec. 23, 1991, Univ Mosc Lo...
XP-002263104, May 23, 1977, Keio Kaken Ko..
XP-002263105, Feb. 2, 1978, Onoda Cement Co.
XP-002263106, May 15, 1991, Khark Water Su.

* cited by examiner

Primary Examiner—Peter A. Hruskoci
(74) Attorney, Agent, or Firm—Oyen Wiggs Green & Mutala LLP

(57) ABSTRACT

A method for removing metal contaminants from water uses lignin derivatives, such as lignosulfonates and kraft lignin, a coagulant, such as a metal salt, and a pH-increasing composition. The lignin derivative is dispersed in the contaminated water, the coagulant is added and the pH is adjusted as required to cause flocculation. A sludge is formed that contains the metals and that is separated from the treated water by filtration. Related methods are used to reduce the leachable metal content of contaminated soils. The invention also provides a composition for stabilizing the metal contaminants in soil, comprising lignin derivatives, a coagulant and a composition for increasing the pH. The mixture is blended with the contaminated soil, reducing its leachable metal content.

32 Claims, No Drawings

METHOD FOR TREATING METAL-CONTAMINATED WATER AND SOIL

TECHNICAL FIELD

This invention pertains to the use of lignin derivatives in the removal of metal contaminants from water. It further pertains to the immobilization of leachable metal contaminants in soils and sediments.

BACKGROUND OF THE INVENTION

Contamination of water and soils by heavy metals is a serious environmental concern. As one example, soil contamination by mercury and other heavy metals is a common result of mining operations. Such heavy metals typically leach into water that comes into contact with the contaminated soil. The metals therefore give rise to environmental hazards in respect of both the contaminated soil and the water contaminated thereby, which may find its way into drinking water supplies.

Various processes have been proposed for reducing the metal content of wastewater. It is known that flocculating agents are of use in such processes. For example, U.S. Pat. No. 5,720,886 (Iwinski) discloses a process for removing metals from mine wastewaters that uses an anionic polymer and a flocculent.

It is also known that a variety of compounds form complexes with metal ions, providing the potential to remove the metal ions from the compositions they contaminate. Lignin is commonly considered to be the precursor of humic and fulvic acids, which are major organic constituents of soils. The capacity of humic and fulvic acids to complex metal ions is well established. For example, U.S. Pat. No. 6,143,692 (Sanjay et al.) discloses a process for removing metals from water using humic acid.

Kraft lignin and lignosulfonates are two classes of lignin derivatives available commercially. They are produced as by-products of the sulfate and sulfite pulping processes respectively. Lignosulfonates have been used in processes for the removal of various organic contaminants from water. Such processes are disclosed, for example, in U.S. Pat. No. 5,736,032 (Cox et al.), U.S. Pat. No. 4,933,087 (Markham, Jr. et al.) and U.S. Pat. No. 5,308,499 (Dixon et al.).

Lignosulfonates and kraft lignin contain an abundance of oxygen-containing functional groups, which are capable of forming lignin-metal complexes with high stability through ionic and covalent chemical bonding. It would be desirable to be able to use these plentiful and inexpensive lignin derivatives in processes for the effective removal of heavy-metal contaminants from water, and for the stabilization of heavy metal contaminants in soils, so that their leachability from such soils is substantially reduced.

SUMMARY OF INVENTION

It is an object of the invention to provide an efficient and economical process for the removal of metal contaminants from water using lignin derivatives and a coagulant.

It is a further object of the invention to provide a process for stabilizing the metal contaminants in soils, by use of lignin derivatives and a coagulant, or, alternatively, by use of sludge produced by processes for treating water that contains humic or fulvic acids.

According to one embodiment of the invention, there is provided a method of removing metal contaminants from water. Lignin derivatives, such as lignosulfonates or kraft lignin, are dispersed in the contaminated water. A coagulant, such as a metal salt, is added. The pH of the water is adjusted, if necessary, to cause the formation of a floc. For example, the pH may be adjusted by the addition of a suitable composition, such as hydrated lime. The floc is allowed to coagulate and form a sludge, which is then separated from the treated water, preferably by filtration. In a variant of this method, the floc is separated from the treated water directly after its formation, rather than allowing it to settle.

According to a further aspect of the invention, there is provided a method for reducing the leachable metal content of metal-contaminated soil. A solid mixture is prepared comprising lignin derivatives, a coagulant and a composition for increasing the pH of the soil, for example, hydrated lime. This mixture is then blended with the contaminated soil.

According to a further embodiment of the invention, there is provided a method of reducing the leachable metal content of metal-contaminated soil using a sludge obtained from a water treatment process, where the water contains humic or fulvic acid and a heavy metal, for example, metal-contaminated groundwater. The water treatment process comprises dispersing a coagulant in the water, adjusting the pH to cause the formation of a floc and allowing the floc to coagulate and form a sludge. The metal-contaminated soil is then blended with the sludge.

DETAILED DESCRIPTION OF THE PREFERRED EMBODIMENTS

The water that can be treated by the methods of the invention can be any water contaminated by metals, for example, wastewater from a mining site contaminated by mercury. In this specification, the term "soil" includes soil, sediments, mine tailings, gravel, sand, cementitious materials, etc. The term "mixture" in this specification means any combination of the components in issue, without regard to the physical form of the combination, and includes dispersions, suspensions, solutions, colloids, etc.

The metals that can be removed according to the methods of the invention are heavy metals, including mercury, chromium, copper, lead, nickel and zinc, as well as lighter metals, such as aluminum.

The invention provides a new water treatment process in which lignin derivatives are dissolved in metal-contaminated water, where they form a lignin-metal complex. Following formation of this complex, a coagulant, such as ferric chloride, is added to the water, where it hydrolyses to form a floc, such as ferric floc. This floc absorbs the lignin-metal complex, coagulates and settles as sludge. Thus, a clear filtrate is formed which contains only very small residual amounts of the metal contaminants. For example, the dissolved metal content of the water can be reduced from about 4,000 ppb to less than 1 ppb.

In general terms, the method for the removal of metal contaminants from water comprises the steps of dispersing lignin derivatives in the water, adding a coagulant, while agitating the mixture, making flocculation occur, allowing the floc to coagulate and settle to form a sludge, and dewatering the sludge. The sludge produced in this process traps stable complexes of lignin derivatives and metal compounds, which are rendered unleachable according to the standard test protocol, namely the "Toxicity Characteristic Leaching Procedure" (TCLP) (EPA Method 1311).

The lignin derivatives used are preferably lignosulfonates, kraft lignin and sulfonated kraft lignin salts, and mixtures thereof. The lignosulfonates include ammonium, calcium, sodium and potassium lignosulfonates. The sulfonated kraft lignin salts include the ammonium, calcium, sodium and potassium salts. All these lignin derivatives are available as by-products of pulp mill processes.

The coagulants used are any ones that can form a complex with the lignin derivatives that can scavenge the metal ions to be removed. The coagulant is preferably a metal salt, including iron salts and aluminum salts. More preferably it is ferric chloride, ferric sulfate, aluminum chloride or aluminum sulfate.

The mass ratio of the lignin derivatives to the coagulant significantly affects the efficiency of the metal removal process. Preferably, the mass ratio employed is at least 1:0.5 where light metals such as aluminum are being removed. For heavy metals the preferred mass ratio is at least 1:1 and more preferably at least 1:2. For greater clarity, "at least 1:2" means 1:2 and 1: more than 2.

The formation of a floc depends on the pH of the aqueous mixture. Where the water being treated is sufficiently basic, the pH after the addition of lignin derivatives and coagulant may still be sufficiently high that a floc will form. In such case the step of causing the formation of a floc merely involves waiting for the floc to form after the lignin derivatives and coagulant have been dispersed in the water. In general, however, it is necessary to increase the pH by the addition of a suitable basic composition. This is preferably done after the addition of the coagulant. It can also be done before dispersing the lignin derivative in the water to be treated, or after dispersing the lignin derivative but before dispersing the coagulant.

Suitable compositions for adjusting the pH include hydrated lime, calcium oxide, magnesium hydroxide, soda ash and sodium hydroxide. The pH is adjusted to a pH appropriate for effecting coagulation, preferably a pH in the range of 4–8, and more preferably in the range of 5–6.

The sludge is removed by any convenient means. Preferably, it is removed by filtering the treated water and sludge, for example in a filter press, to separate the sludge, which contains the complexed metals, from a clear filtrate, having a greatly reduced metal content. Other sludge-removal means include decanting, centrifuging and using a clarifier.

In a variant of the method described above for removing metal contaminants from water, rather than allowing the floc to coagulate and settle as a sludge, once the floc forms it is separated from the solution, for example by filtration, leaving a clear filtrate. In this method, the step of allowing the floc to coagulate and settle is not required. The floc is filtered out directly, using a filter that is sufficiently fine to remove floc comprising small particles.

EXAMPLE 1

A wastewater having a pH of 9.3, a total mercury concentration of 2490 µg/L, a dissolved mercury concentration (size≦0.45 µm) of 1880 µg/L, and a conductivity of 1300 microSiemens/cm, was treated by mixing 100 parts by weight of wastewater with 0.4 parts by weight ammonium lignosulfonates. 3.2 parts by weight of a 40 weight % ferric chloride solution was added while agitating the mixture. The pH was adjusted to 5.1 using hydrated lime. The resulting sludge was removed by filtration, leaving a filtrate having a mercury content of 0.67 µg/L.

EXAMPLE 2

Following the procedure of Example 1, 100 parts by weight of the wastewater of Example 1 was treated with 0.9 parts by weight of kraft lignin and 4 parts of a 40 weight % ferric chloride solution. The final pH after hydrated lime addition was 5.2. The filtrate had a mercury content of 0.75 µg/L.

The above Examples 1 and 2 show that lignin derivatives, including ammonium lignosulfonates and kraft lignin, are capable of trapping dissolved mercury in a ferric sludge. The mass ratio of lignin derivative to ferric chloride in Examples 1 and 2 was 1:3.2 and 1:2.1 respectively.

EXAMPLE 3

Following the procedure of Example 1, 100 parts by weight of the wastewater of Example 1 was treated with 0.4 parts by weight of ammonium lignosulfonate and 1 part of a 40 weight % ferric chloride solution. The final pH after hydrated lime addition was 5.0. The filtrate had a mercury content of 126 µg/L. In this example, the mass ratio of lignin ferric chloride was 1/1, which did not achieve the low mercury content in the filtrate of Examples 1 and 2. A suitable mass ratio of the lignin derivative to ferric chloride is necessary to achieve very low residual concentrations of mercury in the treated water.

EXAMPLE 4

A wastewater having a pH of 5.5, a total mercury concentration of 3370 µg/L, a dissolved mercury concentration (size≦0.45 µm) of 2657 µg/L and a conductivity of 3100 microSiemens/cm, was treated by mixing 100 parts by weight of wastewater and 0.8 parts by weight of a 40 weight % ferric chloride solution giving a final pH of 3.9. The filtrate had a mercury content of 1480 µg/L. This example shows that the addition of ferric chloride alone is not sufficient to trap mercury to achieve the low levels of residual mercury obtained in Examples 1 and 2.

EXAMPLE 5

A wastewater was obtained from a soil washing operation having a pH of 11.6, a total mercury concentration of 498 µg/L, a dissolved mercury concentration (size≦0.45 µm) of 5.63 µg/L, suspended mercury concentration (0.45 µm<size≦2.0 µm) of 68 µg/L and a conductivity of 800 microSiemens/cm. This wastewater was treated according to the procedure of Example 1 by adding 0.2 parts by weight of ammonium lignosulfonate to 100 parts by weight of wastewater, followed by the addition of 3.3 parts by weight of 40 weight % ferric chloride solution and 0.56 parts by weight of hydrated lime. The pH was adjusted to a value of 5.4 through the addition of soda ash. The treated wastewater was passed separately through filter paper of pore size 0.45 µm and through filter paper of pore size 2.0 µm. The dissolved mercury concentration (size≦0.45 µm) of the filtrate was 0.61 µg/L and the suspended mercury concentration (0.45 µm<size≦2.0 µm) was not detectable. Suspended mercury colloids were efficiently removed by the process.

EXAMPLE 6

A simulated wastewater was prepared by blending tap water and standard solutions of aluminum, chromium, copper, lead, zinc and nickel. The concentrations of the metal ions in the simulated wastewater were determined by ICP analysis and are summarized in Table 1. The simulated wastewater was treated by mixing 100 parts by weight of wastewater and 0.2 parts by weight of ammonium lignosulfonate followed by the addition of 3.2 parts by weight of 40 weight % ferric chloride solution. The pH of the solution was adjusted to 5.6 by adding 0.07 parts of sodium sulfite and hydrated lime. A floc formed which settled as a sludge. A portion of the solution was passed through a filter paper with a pore size of 0.45 µm and was analyzed by ICP. A second portion of the solution was treated by adjusting the pH to 8.6 through the addition of soda ash. After filtration through a filter paper with a pore size of 0.45 µm this second portion was also analyzed by ICP. The analytical results are summarized in Table. 1.

TABLE 1

Metal Ion Removal from Aqueous Solutions

| Metal Species | Con- centration Before Treatment (µg/L) | Concentration After Treatment (µg/L) | | | |
|---|---|---|---|---|---|
| | | At pH 5.6 | | At pH 8.6 | |
| | | (µg/L) | Reduction (%) | (µg/L) | Reduction (%) |
| Aluminum | 470 | 50 | 89.4 | 60 | 87.2 |
| Chromium | 213 | 10 | 95.3 | 10 | 95.3 |
| Copper | 2850 | 24 | 99.2 | 22 | 99.2 |
| Lead | 120 | <MDL[1] | >75 | <MDL[1] | >75 |
| Nickel | 120 | 40 | 81.0 | 100 | 52.4 |
| Zinc | 7910 | 43 | 99.5 | <5 | >99.9 |

Note:
[1]Method Detection Limit (MDL) in µg/L analysis was as follows: Al:20, Cr:5, Cu:5, Pb:30, Ni:10, Zn:5.

The results of Table 1 show that metal ions can be removed effectively from aqueous solutions through the process of this invention. It is also evident that, in addition to the mass ratio between lignin derivatives and ferric chloride, final pH is an important parameter which affects the efficiency of metal recovery from wastewater.

According to a second embodiment of the invention, there is provided a method for reducing the leachable metal content of metal-contaminated soil.

The natural characteristic of soil to stabilize diverse metal ions is based on the ability of humic and fulvic acids to form stable complexes with polyvalent metal ions, such as $Al^{3+}$, $Fe^{3+}$, $Cu^{2+}$, $Pb^{2+}$, $Ca^{2+}$ and $Mn^{2+}$. The formation of these complexes plays an important role in the mobilization, transport, segregation and deposition of metals in soils, sedimentary rocks, and biogenic deposits of various types.

In a similar manner, the addition of small amounts of lignin derivatives to the metal-contaminated soils increases the capacity of the soil to retain metal ions. This is believed to be due to the formation of metal complexes with the lignin derivatives through strong coordinate bonding. While linking together, the negatively charged clay and lignin derivatives are neutralized by the positively charged metal ions.

In general terms, the method for reducing the leachable metal content of soil comprises the steps of preparing a mixture of a lignin derivative, a coagulant and a compound for increasing the pH of the soil, and blending the mixture, which acts as a metal-absorbent, with the soil to be treated.

The metals that can be removed, and the lignosulfonate derivatives, pH-adjusting compositions and flocculents that are used in this method, are the same as those described above in respect of the method of removing metal contaminants from water.

The coagulant is provided in the form of an aqueous solution or as a solid powder. Aqueous solutions of coagulant having about 39–45 weight percent of coagulant are preferred. Ferric chloride solutions having about 40 weight percent ferric chloride in water are commercially available and are particularly preferred.

The mass ratio of the lignin derivatives to the composition for increasing pH is preferably in the range of 1:1 to 1:8, and more preferably 1:1 to 1:4.

In a particularly preferred mixture, the pH-adjusting composition is hydrated lime and the coagulant is an aqueous ferric chloride solution having about 40 weight percent ferric chloride. The mass ratio of lignin derivatives to hydrated lime to ferric chloride solution is about 1:1.5:2.5.

In the blend of mixture and soil being treated, the mass ratio of mixture to soil is preferably in the range of 1:5 to 1:100.

The method reduces the leachable mercury content of the soil to such an extent that the stabilized soils can, in many jurisdictions, be legally disposed of in non-hazardous waste disposal sites.

As an illustration of this aspect of the invention, lignin derivatives, ferric chloride and hydrated lime were blended in suitable proportion to produce a solid absorbent. This mixture was blended with mercury-contaminated soil in suitable proportion. The TCLP-leachable mercury of this stabilized soil was typically reduced by over 80%.

EXAMPLE 7

A mercury-contaminated soil having the characteristics shown in Table 2 from a chloralkali plant site was treated by blending 100 parts by weight of the soil with 10 parts by weight of a sodium lignosulfonate-ferric chloride matrix having hydrated lime as the pH-increasing component. The mass ratio of lignin derivatives to hydrated lime to ferric chloride solution (40% by weight ferric chloride) was about 1:1.5:2.5. The stabilized soil was then tested according to the TCLP procedure at intervals over a period of 30 days. The results are set out in Table 2. The leachable mercury content of the soil was reduced by about 80%.

TABLE 2

Stabilization of Leachable Mercury in Soil

| Sample Analysis | Before Treatment | After Treatment | | | | |
|---|---|---|---|---|---|---|
| | | 15 min | 7 days | 14 days | 21 days | 30 days |
| Soil pH[1] | 11.8 | 11.8 | 11.4 | 11.5 | 11.2 | 11.0 |
| TCLP[2] extract pH | 6.1 | 6.4 | 7.0 | 6.4 | 6.4 | 7.0 |
| Total Hg in TCLP extract (µg/L) | 268 | 76.4 | 35.0 | 28.0 | 35.8 | 39.3 |
| Reduction of Leachable HG (%) | — | 71.5 | 86.9 | 89.6 | 86.6 | 85.3 |

Note:
[1]5.0-g soil sample in 96.5 ml deionized water.
[2]US EPA Method 1311.

According to a further embodiment of the invention, there is provided another method for reducing the leachability of metals in metal-contaminated soil. This method does not require the addition of lignin derivatives, and makes use of the fact that humic and fulvic acids are naturally present in many groundwaters. A sludge is prepared according to a process essentially the same as that described above for removing contaminants from water, except that lignin derivatives are not used. First, water (such as groundwater) containing humic or fulvic acid and a metal is provided, and a coagulant is dispersed therein. A floc is caused to be formed, preferably by the addition of a pH-increasing composition. The floc is allowed to coagulate and form a sludge which is then separated from the treated groundwater, for example by filtration. The sludge thus produced is blended with the metal-contaminated soil. As a variant of this method, the floc is separated directly after its formation, for example by filtration, and the filtered flow, which comprises a sludge, is blended with the metal-contaminated soil.

In this process, the metals that can be stabilized and the pH-adjusting compositions and flocculents used the same as those described above in respect of the method of removing metal contaminants from water.

In the blend of sludge and soil, the mass ratio of sludge to soil is preferably in the range of 1:5 to 1:100.

EXAMPLE 8

Two large scale trials were carried out where the mercury-contaminated soil characterized in Table 2 was stabilized by using a ferric sludge generated in a groundwater treatment plant. This plant was operated to remove humic and fulvic acids and mercury through flocculation with ferric chloride. In one trial, 5.7 tonnes of soil were blended with 0.77 tonnes of ferric sludge, while in a second trial 9.1 tonnes of soil were blended with 0.92 tonnes ferric sludge. Once blending of the soil and sludge through an excavator was completed, stabilized soil samples were tested by TCLP. The leachable mercury content of the soil was reduced from 245 µg/L to less than 40 µg/L. In repeated TCLP tests over a period of 60 days, the leachable mercury remained in the range of 13.8 µg/L to 38.6 µg/L.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of reducing the leachability of metals of metal-contaminated soil, comprising the steps of:
    (a) preparing a mixture comprising:
        (i) lignin derivatives;
        (ii) an aluminum or iron salt coagulant; and
        (iii) a composition selected from the group consisting of hydrated lime, calcium oxide, magnesium hydroxide, soda ash and sodium hydroxide for increasing the pH of said soil, wherein said coagulant forms a complex with said lignin derivatives for scavenging said metals; and
    (b) blending said mixture with said soil, to reduce the leachability of said metals in said soil.

2. A method according to claim 1 wherein the metal contaminants comprise one or more of mercury, chromium, copper, lead, nickel and aluminum.

3. A method according to claim 1 wherein said lignin derivatives comprise lignosulfonates.

4. A method according to claim 3 wherein said lignosulfonates comprise one or more of:
    (i) ammonium lignosulfonates;
    (ii) calcium lignosulfonates;
    (iii) sodium lignosulfonates; and
    (iv) potassium lignosulfonates.

5. A method according to claim 1 wherein said lignin derivatives comprise kraft lignin.

6. A method according to claim 1 wherein said lignin derivatives comprise sulfonated kraft lignin salts.

7. A method according to claim 6 wherein said sulfonated kraft lignin salts comprise sulfonated kraft lignin salts of ammonium, calcium, sodium or potassium.

8. A method according to claim 1 wherein said iron salt is ferric chloride.

9. A method according to claim 1 wherein said iron salt is ferric sulfate.

10. A method according to claim 10 wherein said aluminum salt is aluminum chloride or aluminum sulfate.

11. A method according to claim 1 wherein the mass ratio of said lignin derivatives to said coagulant is at least 1:0.5.

12. A method according to claim 1 wherein the mass ratio of said lignin derivatives to said coagulant is at least 1:1.

13. A method according to claim 1 wherein the mass ratio of said lignin derivatives to said coagulant is at least 1:2.

14. A method according to claim 1 wherein the mass ratio of said lignin derivatives to said composition for increasing the pH is in the range of 1:1 to 1:4.

15. A method according to claim 1 wherein the mass ratio of said lignin derivatives to said composition for increasing the pH is in the range of 1:1 to 1:8.

16. A method according to claim 1 wherein the mass ratio of said mixture to said soil is in the range of 1:5 to 1:100.

17. A method of reducing the leachability of mercury from a mercury-contaminated soil, comprising the steps of:
    (a) preparing a mixture comprising:
        (i) a lignin derivative comprising one or more of lignosulfonates and kraft lignin;
        (ii) an aqueous ferric chloride solution; and
        (iii) hydrated lime, wherein said ferric chloride forms a complex with said lignin derivatives for scavenging said mercury; and
    (b) blending said mixture with said contaminated soil, to reduce the leachability of mercury from said soil.

18. A method of reducing the leachability of metals of metal-contaminated soil, comprising the steps of:
    (a) preparing a sludge prepared by the process of:
        (i) providing water containing humic or fulvic acid and a metal;
        (ii) dispersing a metal salt coagulant in said water;
        (iii) causing the formation of a floc including said humic or fulvic acid in the mixture of step (a)(ii);
        (iv) allowing said floc to coagulate and form said sludge; and
        (v) separating said sludge from said treated water; and
    (b) blending said sludge with said metal-contaminated soil, to reduce the leachability of said metals in said soil.

19. A method according to claim 18 wherein said step of causing the formation of a floc comprises adjusting the pH of said water so as to cause flocculation.

20. A method according to claim 19 wherein said pH is adjusted by the addition of one or more of hydrated lime, calcium oxide, magnesium hydroxide, soda ash and calcium hydroxide.

21. A method according to claim 19 wherein said pH is adjusted to a pH in the range of 4–10.

22. A method according to claim 19 wherein said pH is adjusted to a pH in the range of 5–6.

23. A method according to claim 18 wherein the metal contaminants comprise one or more of mercury, chromium, copper, lead, nickel, zinc and aluminum.

24. A method according to claim 18 wherein said metal salt coagulant is an iron salt.

25. A method according to claim 24 wherein said iron salt is ferric chloride.

26. A method according to claim 24 wherein said iron salt is ferric sulphate.

27. A method according to claim 18 wherein said coagulant is an aluminum salt.

28. A method according to claim 18 wherein said aluminum salt is aluminum chloride or aluminum sulfate.

29. A method according to claim 18 wherein step (d) comprises allowing said floc to settle in a clarifier.

30. A method according to claim 18 step (e) comprises removing said sludge by filtration.

31. A method of reducing the leachability of metals of metal-contaminated soil, comprising the steps of:
   (a) preparing a sludge prepared by the process of:
      (i) providing water containing humic or fulvic acid and a metal;
      (ii) dispersing a metal salt coagulant in said water;
      (iii) causing the formation of a floc including said humic or fulvic acid in the mixture of step (a)(ii); and
      (iv) separating said floc from an aqueous filtrate; and
   (b) blending said separated floc with said metal-contaminated soil, to reduce the leachability of said metals in said soil.

32. A method of reducing the leachability of mercury from a mercury-contaminated soil, comprising the steps of:
   (a) providing a sludge prepared by the process of:
      (i) providing groundwater containing humic and fulvic acids and mercury;
      (ii) dispersing ferric chloride in said water;
      (iii) adjusting the pH of said water so as to cause the formation of a floc, including said humic or fulvic acids;
      (iv) allowing said floc to coagulate and form said sludge; and
      (v) separating said sludge from said treated water; and
   (b) blending said sludge with said mercury-contaminated soil, to reduce the leachability of said mercury in said soil.

* * * * *